United States Patent
Chen

(10) Patent No.: US 8,144,732 B2
(45) Date of Patent: Mar. 27, 2012

(54) METHOD FOR BOOSTING DOWNLINK TRANSMISSION TO MOBILE STATION AND SYSTEM UTILIZING THE SAME

(75) Inventor: Yu-Cheng Chen, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 250 days.

(21) Appl. No.: 12/478,841

(22) Filed: Jun. 5, 2009

(65) Prior Publication Data

US 2010/0165920 A1    Jul. 1, 2010

Related U.S. Application Data

(60) Provisional application No. 61/141,857, filed on Dec. 31, 2008.

(51) Int. Cl.
*H04J 3/16* (2006.01)

(52) U.S. Cl. .......................................................... 370/468

(58) Field of Classification Search .................... 370/468
See application file for complete search history.

(56) References Cited

U.S. PATENT DOCUMENTS

| 2001/0038640 A1* | 11/2001 | McKinnon et al. | 370/468 |
| 2003/0103527 A1* | 6/2003 | Beser | 370/468 |
| 2008/0137618 A1* | 6/2008 | Sung et al. | 370/336 |
| 2009/0285150 A1* | 11/2009 | Ravishankar et al. | 370/316 |

* cited by examiner

*Primary Examiner* — Jason Mattis
*Assistant Examiner* — Stephen J Clawson
(74) *Attorney, Agent, or Firm* — Thomas|Kayden

(57) ABSTRACT

The invention discloses a method for boosting the downlink transmission rate to a mobile station by a processing unit thereof, including the steps of requesting a base station for a bandwidth amount for transmission of at least one un-generated acknowledgement (ACK) packet, generating the ACK packet or packets, and instructing an RF module to transmit the ACK packet or packets to the base station following a notification from the base station indicating that the requested bandwidth amount has been allocated.

13 Claims, 18 Drawing Sheets

| Source Port (16) | | | | | | | Destination Port (16) | |
|---|---|---|---|---|---|---|---|---|
| Sequence Number (32) | | | | | | | | |
| Acknowledgement Number (32) | | | | | | | | |
| Data Offset (4) | Reserved (6) | UGR | ACK | PSH | RST | SYN | FIN | Window (16) |
| Checksum (16) | | | | | | | Urgent Pointer (16) | |
| Options (0 or 32 bit words + padding) | | | | | | | | |
| Data... | | | | | | | | |

FIG. 4

| Source Port | | | | | | | Destination Port | | |
|---|---|---|---|---|---|---|---|---|---|
| Sequence Number=100 | | | | | | | | | |
| Acknowledgement Number=0 | | | | | | | | | |
| Data Offset | Reserved | UGR | ACK | PSH | RST | SYN=1 | FIN | Window=200 | |
| Checksum | | | | | | | Urgent Pointer | | |
| Options (0 or 32 bit words + padding) | | | | | | | | | |
| Data... | | | | | | | | | |

| Source Port | | | | | | | Destination Port | |
|---|---|---|---|---|---|---|---|---|
| Sequence Number=190 ||||||||  |
| Acknowledgement Number=101 |||||||| |
| Data Offset | Reserved | UGR | ACK | PSH | RST | SYN=1 | FIN | Window=250 |
| Checksum |||||||| Urgent Pointer |
| Options (0 or 32 bit words + padding) ||||||||  |
| Data… ||||||||  |

| Syntax | Size (bit) |
|---|---|
| Grant Management Subheader { | - |
| If (scheduling service type==UGS { | - |
| SI | 1 |
| PM | 1 |
| FLI | 1 |
| FL | 4 |
| *Reserved* | 9 |
| } else if {scheduling service type==ertPS) { | 1 |
| Extended piggyback request | 11 |
| FLI | 1 |
| FL | 4 |
| } else { | - |
| Piggyback request | 16 |
| } | - |
| } | - |

FIG. 13E

METHOD FOR BOOSTING DOWNLINK TRANSMISSION TO MOBILE STATION AND SYSTEM UTILIZING THE SAME

CROSS REFERENCE TO RELATED APPLICATIONS

This application claims the benefit of U.S. Provisional Application No. 61/141,857, filed on Dec. 31, 2008, the entirety of which is incorporated by reference herein.

BACKGROUND OF THE INVENTION

1. Field of the Invention

The invention relates generally to a method for boosting the downlink transmission to a mobile station, and more particularly, to a method for boosting the downlink transmission to a mobile station and a system utilizing the same.

2. Description of the Related Art

Among various communication topologies, Transmission Control Protocol (TCP) is the most common end-to-end data transmission protocol among computer hosts. The acronym TCP usually appears with Internet Protocol (IP) because TCP is widely deployed as a transport layer protocol over IP networks. TCP/IP supports error-free data transfers, in-order deliveries, congestion control and flow control. TCP/IP is suitable for data transmission over the Internet as it has excellent ability to restrain network congestion and guarantee traffic integrity. Thus, most Internet applications use TCP/IP, such as the File Transfer Protocol (FTP) and World Wide Web (WWW) applications. TCP data transfer aims at providing an error-free channel over two endpoints, i.e. transmitting party and receiving party. Therefore, TCP is able to handle some problems that commonly occur in communication networks, such as packet loss, out-of-order routing and duplicated data. In addition, TCP also allows data recovery for damaged or lost data. Since two endpoints of a TCP session may have different processing capabilities due to different processors or buffer sizes, TCP also performs an end-to-end flow control to prevent the transmitting party from sending too much data to the receiving party. The flow control mechanism is achieved by using a sliding window. The TCP window size determines the amount of data flow. In addition, TCP also provides congestion control which dynamically adjusts the transmission rate based on the network conditions. The transmitting party may increase or decrease the window size based on network conditions. If the network condition is good enough, the window size is increased and vice versa. The most important indicator for network condition is the acknowledgement packet (ACK packet) that is replied by a receiving party. For a good network condition, the replies of the ACK packets are rapid. To boost the downlink bandwidth rate, a procedure is needed to reply ACK packets as earlier as possible.

BRIEF SUMMARY OF THE INVENTION

The invention discloses a method for boosting the downlink transmission rate to a mobile station by a media access control (MAC) unit thereof, comprising the steps of requesting a base station for a bandwidth amount for transmission of at least one un-generated acknowledgement (ACK) packet, generating the ACK packet or packets, and instructing an RF module to transmit the ACK packet or packets to the base station following a notification from the base station indicating that the requested bandwidth amount has been allocated.

Furthermore, the invention discloses a system for boosting the downlink transmission, comprising an RF module and a media access control (MAC) unit. The processing unit is coupled to the RF module, requesting a base station for a bandwidth amount for transmission of at least one un-generated acknowledgement (ACK) packet, generating the ACK packet or packets, and directing the RF module to transmit the generated ACK packet or packets to the base station following a notification from the base station indicating that the requested bandwidth amount has been allocated.

BRIEF DESCRIPTION OF THE DRAWINGS

The invention can be more fully understood by reading the subsequent detailed description and examples with references made to the accompanying drawings, wherein:

FIG. 4 shows the data structure of a TCP packet according to an embodiment of the invention;

FIG. 6 shows an exemplary format of a TCP packet according to an embodiment of the invention;

FIG. 7 shows an exemplary format of an ACK packet according to an embodiment of the invention;

FIG. 13E shows a Grant Management Subheader for a bandwidth request according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
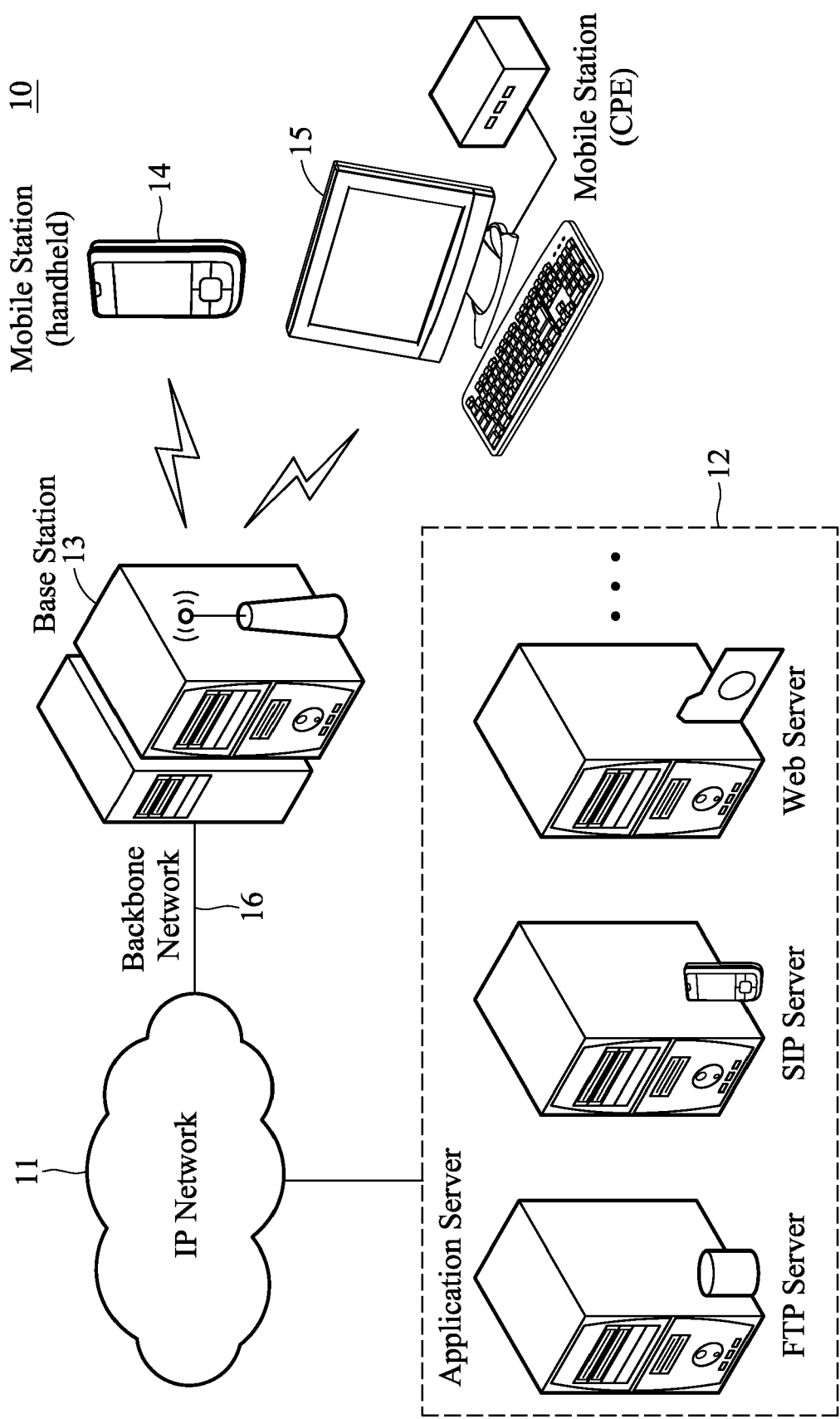
FIG. 1 shows an architecture of a WiMAX network according to an embodiment of the invention.

Worldwide Interoperability for Microwave Access (WiMAX) is an alternative for wireless communication technology which provides an enhanced infrastructure for the transmission of data, audio and video signals over a range of 30 miles. It was originally designed for the last mile of a broadband access network and used to replace the wired communication networks such as Digital Subscriber Line (DSL), Cable Modem and so on. WiMAX was developed based on the Institute of Electronics and Electrical Engineers (IEEE) Standard 802.16 which describes Media Access Control (MAC) layers and Physical (PHY) layers. The WiMAX network topology is based on a point-to-multipoint architecture as illustrated in FIG. 1, which shows an architecture of a WiMAX network 10 according to an embodiment of the invention. Referring to FIG. 1, the WiMAX network 10 utilizes a centralized control unit, namely the base station 13, to provide network resources and arrange uplink and downlink traffic transmission over its coverage. The WiMAX client, namely the mobile stations 14 and 15, communicates with the base station 13 to obtain network connectivity based on the IEEE 802.16 protocol. The base station 13 provides the network access services to the mobile stations 14 and 15, allowing the mobile stations 14 and 15 to reach an application server 12 through the IP network 11. Various application servers resident on the IP network 11 communicates with the mobile stations 14 and 15 via a backbone network 16 and the base station 13. The application server 12 may be a FTP server, a Session Initiation Protocol (SIP) server or a Web server. The mobile stations 14 and 15 may be a handset or a customer-premises equipment (CPE), but are not limited thereto.

Figure 2:
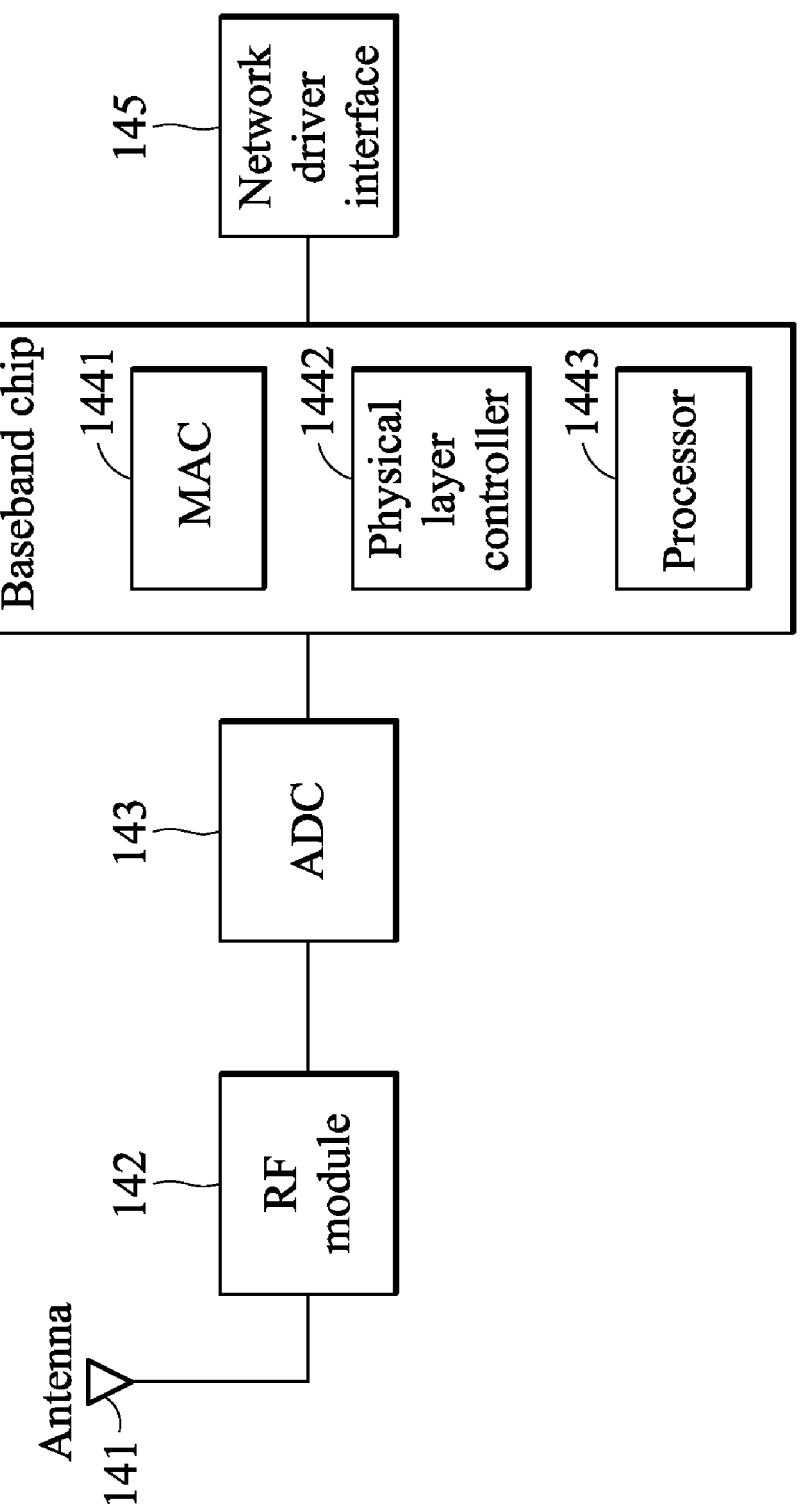
FIG. 2 shows a block diagram of a mobile station according to an embodiment of the invention.

Referring to FIG. 2, the mobile station 14 or 15 may comprise an antenna 141, a radio frequency (RF) module 142, an analog to digital converter (ADC) 143, a baseband chip 144 and a network driver interface 145. The antenna 141 and the RF module 142 are responsible for receiving and transmitting air signals. The ADC 143 is responsible for analog/digital conversion for the air signals. The baseband chip 144 may comprise a Media Access Control (MAC) 1441, a physical layer controller 1442, and a processor 1443. Both the MAC 1441 and the physical layer controller 1442 are implemented based on the IEEE 802.16 standard. The MAC 1441 provides an upper application and a modem interface and negotiates with the MAC of the base station 13 based on the IEEE 802.16 standard. The physical layer controller 1442 is responsible for signal modulation and coding. The base station 13 may comprise several components for receiving and transmitting one or more service flows from and to one or more mobile stations 14 and 15, wherein the service flows are designed to meet Quality of Service (QoS) requirements. In the downlink direction, the base station 13 broadcasts data of service flows to all mobile stations 14 and 15. As for the uplink direction, the network bandwidth is distributed in a request-and-grant manner. The base station 13 is in charge of coordinating the bandwidth resources. Once a mobile station 14 or 15 demands bandwidth, it makes a bandwidth request to the base station 13 in either a contention-based or a unicast manner. When the base station 13 receives the request, the scheduler (not shown) of the base station 13 will decide whether the bandwidth request is granted or not. When a bandwidth grant signal is replied (i.e. the bandwidth request is granted) to a specific mobile station 14 or 15, the mobile station 14 or 15 scheduler is awakened and arranges the data packets to be sent upon the granted transmission. A detailed procedure for a bandwidth request is illustrated in FIG. 3 below.

Figure 3:
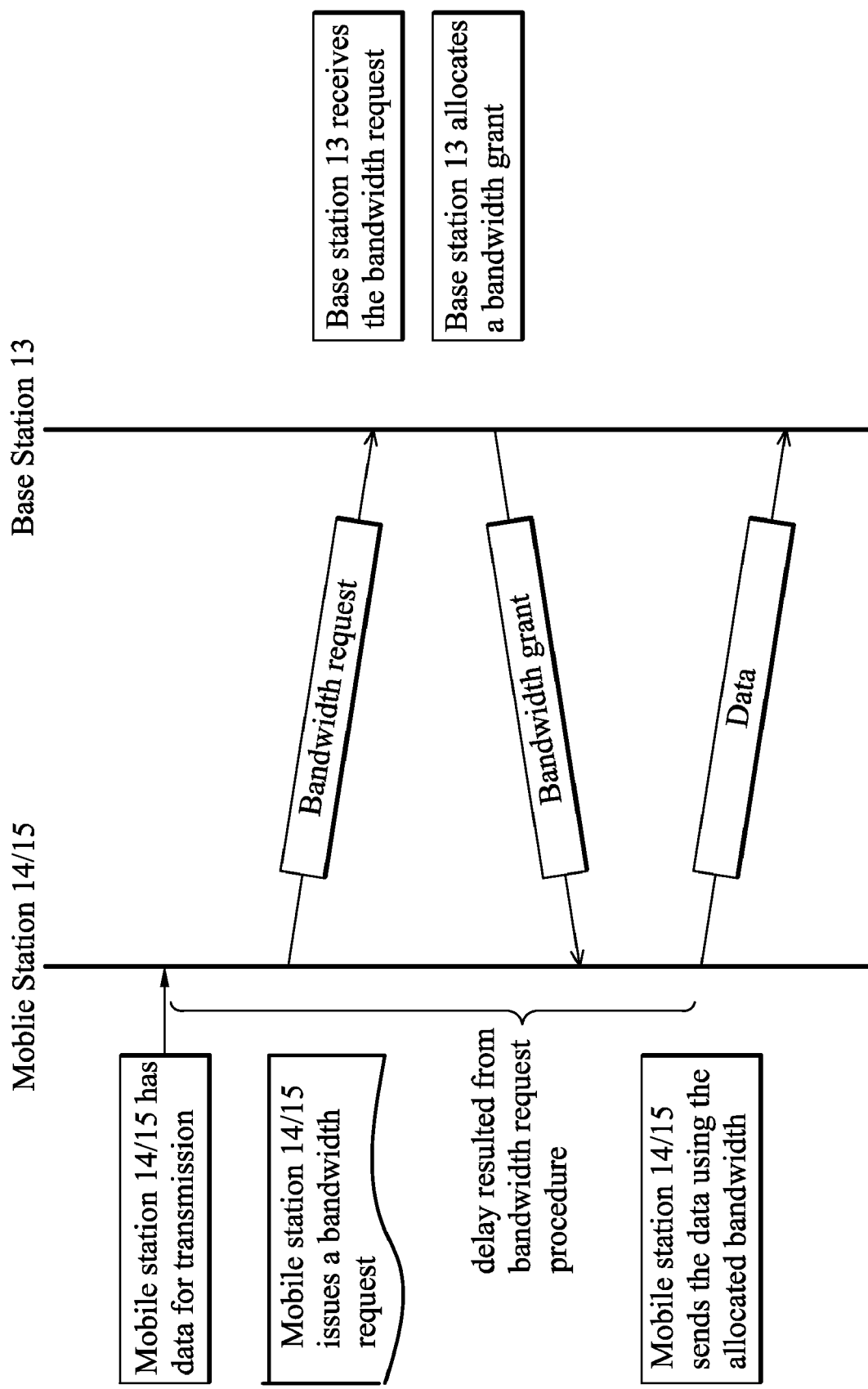
FIG. 3 shows a WiMAX bandwidth request procedure between a mobile station and a base station according to an embodiment of the invention.

FIG. 3 shows a WiMAX bandwidth request procedure between a mobile station and a base station according to an embodiment of the invention. Bandwidth Scheduling is a kernel process for wireless communication networks. An efficient bandwidth scheduling ensures quality of service and optimizes system throughput. The base station 13 and the mobile station 14 or 15 employ two phases of bandwidth scheduling. The bandwidth scheduling tasks are operated at real-time to provide a required QoS in order to fully utilize available bandwidth resources and minimize costs. The WiMAX standard also defines a high level QoS and provides bandwidth scheduling support to enable traffic delivery over wireless environments. However, the standard does not define a specific algorithm for bandwidth scheduling and requires vendor implementation. The types of bandwidth scheduling may comprise: Unsolicited Grant Service (UGS), real-time Polling Service (rtPS), extended real-time Polling Service (ertPS), non-real-time Polling Service (nrtPS), Best Effort (BE) and so on. The scheduling types are designed for well-known applications. The bandwidth scheduling UGS and ertPS are mainly designed for Voice over Internet Protocol (VoIP) applications. The rtPS is used for Moving Picture Experts Group (MPEG) streaming, the nrtPS focuses on the FTP sessions, and the BE is designed for traditional Internet traffic. Each of the types of bandwidth scheduling is specified with a set of parameters for QoS management. For detailed description of service flows and the types of uplink scheduling, reference may be made to the IEEE 802.16 standard.

As stated in the related art above, TCP utilizes a sliding window for flow control. A detailed description of the sliding window is described below. FIG. 4 shows the data structure of a TCP packet according to an embodiment of the invention. The TCP packet in FIG. 4 comprises two portions: a header; and a data payload. The header comprises the following fields: source port, destination port, sequence number, acknowledgement number, data offset, reserved, urgent (URG), acknowledge (ACK), push (PSH), reset (RST), synchronous (SYN), finish (FIN), window, checksum, urgent pointer and options. The source port specifies the source address of a TCP packet, and the destination port specifies the destination address of the TCP packet. The sequence number specifies the order of a transmitted TCP packet. With the specified order for TCP packets, data can be reliably transferred in an appropriate order regardless of fragmentation, disordering or loss. The sequence number increases by 1 for each subsequently transmitted TCP byte. Upon reception of one TCP packet, the receiving party responds with an ACK, informing the transmitting party that its TCP packet has been successfully received. The ACK is also carried by the data structure of the TCP packet (also referred to as ACK packet), and each ACK packet is also given an order specified in the acknowledgement number field. When a TCP packet is transmitted, the transmitting party starts a timer for the transmitted packet. If the responded ACK packet is not received by the transmitting party before the timer expires, the TCP packet is considered lost. Therefore, the transmitting party would retransmit the TCP packet. The data offset field specifies where the data begins. The reserved field is unused and left for future implementation. The URG, ACK, PSH, RST, SYN and FIN are control flags. The control flag URG indicates whether a TCP packet is an urgent one which must be processed immediately. The control flag ACK indicates that the validity of the acknowledgement number. If the acknowledgement number is valid for a TCP packet (the flag ACK is "1"), it indicates that the TCP packet is an ACK packet. The flag ACK is usually set as "1" except for the initial TCP packet requesting for setting up a connection with another party. The control flag PSH indicates whether a TCP packet should be transmitted immediately. If the flag PSH for a TCP packet is set as "1", it indicates that the TCP packet along with that other TCP packets residing in the buffer should be sent right away without waiting for the buffer to be full, and the receiving party is required to pass the received TCP packets to application programs for processing as soon as possible. The control flag RST indicates whether the connection should be terminated immediately. If the flag RST is set as "1", the connection is terminated immediately. The control flag SYN indicates whether synchronization is requested between the transmitting and receiving parties. If the flag SYN is set as "1", the connection between the transmitting and receiving parties is established. The control flag FIN indicates whether the data transmission is about to be finished. If a current TCP packet is the last one to be transmitted, the flag FIN of the TCP packet is set as "1", declaring termination of the data transmission. Thereafter, the two parties terminate the connection. The checksum is for a verification purpose. Before a TCP packet is transmitted, the transmitting party performs a verification process on the transmitted data. The verification process generates a checksum value specified in the checksum field of the transmitted TCP packet. Upon reception of the transmitted TCP packet, the receiving party performs another verification process on the received data. The verification process also generates a checksum value to be further compared with the one specified in the received TCP packet. If the comparison is not consistent, the received TCP packet is considered damaged. Therefore, the transmitting party is requested to retransmit the TCP packet. The urgent pointer indicates that the starting address of the urgent data that must be processed immediately. As an example, assume that the data flow exceeds the system bandwidth, in this situation all transmitting parties will be requested to stop transmitting data to the receiving party. Thereafter, the receiving party enters an urgent state (the urgent pointer is set as "1") and immediately processes the urgent data. After the urgent data is processed, the receiving party goes back to a normal state, allowing the transmitting party to continue the data transmission. The "option" field is used to match TCP packets depending on their TCP options. However, this field is rarely used.

Figure 5:
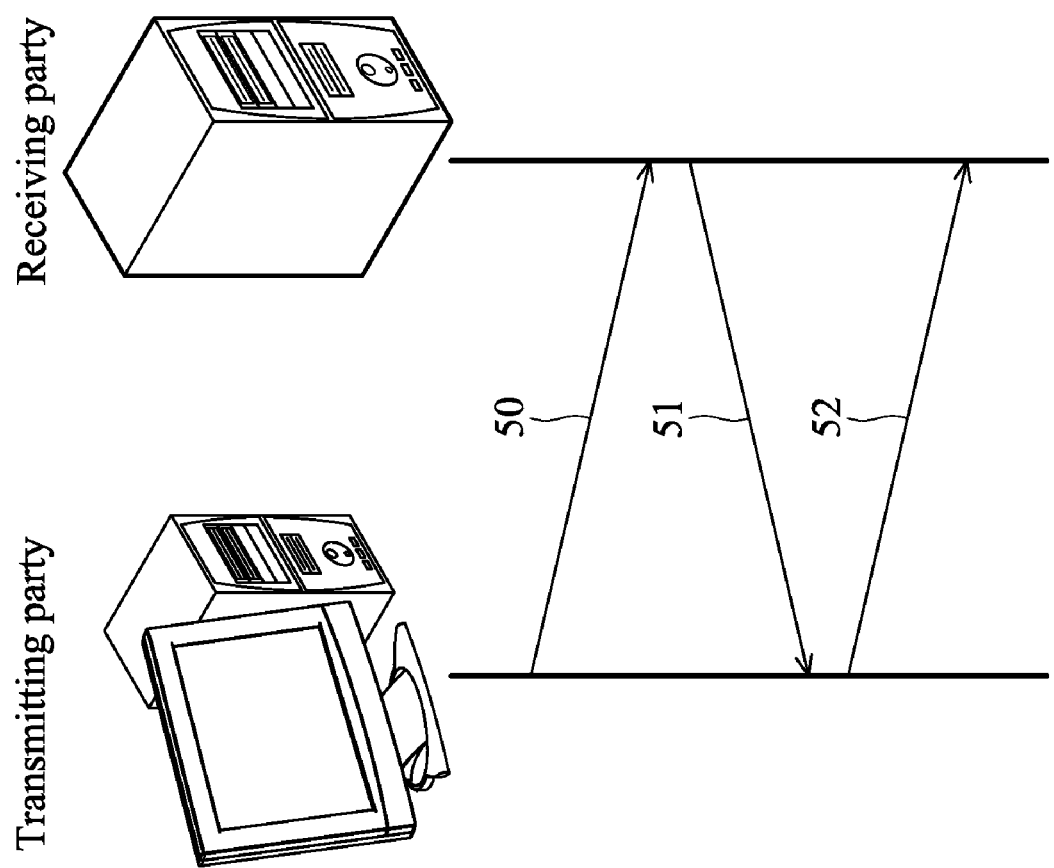
FIG. 5 shows a TCP connection setup diagram between a transmitting party and a receiving party according to an embodiment of the invention.

FIG. 5 shows a TCP connection setup diagram between a transmitting party and a receiving party according to an embodiment of the invention. A three-way handshaking process is employed for the transmitting party to setup a connection with the receiving party. In a first step, the transmitting party issues an initial TCP packet 50 to the receiving party. An exemplary format of the TCP packet 50 is shown in FIG. 6. In FIG. 6, the initial sequence number is shown as 100. This number is randomly generated by the transmitting party. In addition, the window size is specified as 200. This indicates that the transmitting party is currently able to receive up to 200 TCP packets from the receiving party at once. Also, the flag SYN of the TCP packet 50 is set as "1" because this is an initial TCP packet requesting connection with the receiving party. Note that the acknowledgement number specified in the TCP packet 50 is currently not available. In a second step, upon reception of the TCP packet 50 from the transmitting party, the receiving party issues an ACK packet 51 to the transmitting party in acknowledgement of the TCP packet 50. An exemplary format of the ACK packet 51 is shown in FIG. 7. In FIG. 7, the sequence number is set to 190, which is also randomly generated by the receiving party. In addition, the window size is specified as 250, which means that the receiving party is currently able to receive up to 250 TCP packets from the transmitting party at once. Also, the flag SYN of 51 is set as "1" as this is also a packet requesting connection with the transmitting party. At this time, the acknowledgement number of the ACK packet 51 is specified as the transmitting party sequence number plus 1, i.e. 101 in this embodiment. This indicates that the receiving party hopes to receive a next TCP packet with a sequence number specified as 101. In a third step, upon reception of the ACK packet 51, the transmitting party responds with a TCP packet 52. In the TCP packet 52, the acknowledgement number is specified as the receiving party sequence number plus 1, i.e. 191 in this embodiment. In addition, the flag SYN of the packet is no longer set to "1" as the connection has already been set up. The procedure of a TCP connection setup has been described above. Following, a TCP flow control will be illustrated.

Figure 8A:
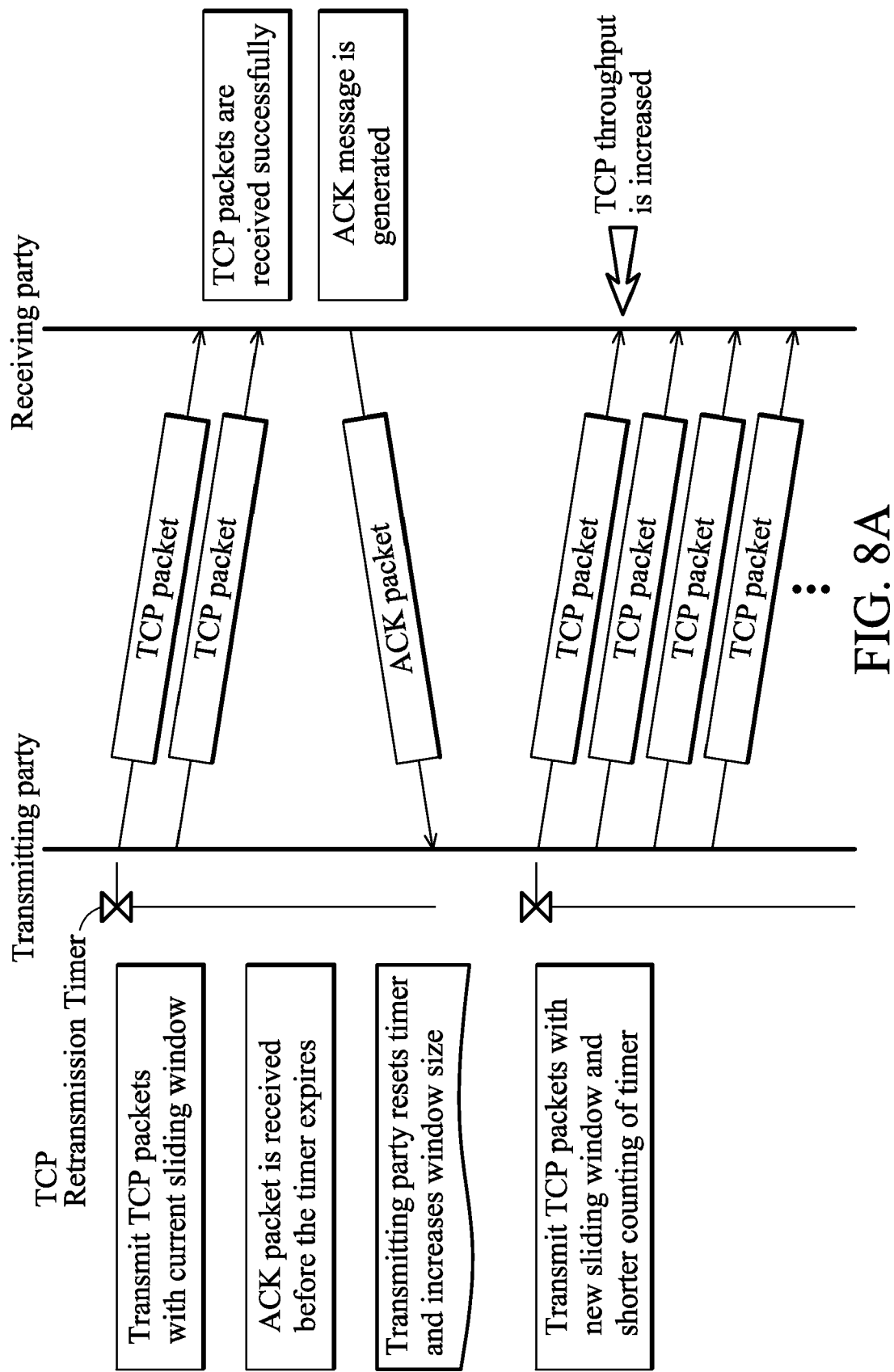
FIG. 8A shows a diagram of an increasing sliding window according to an embodiment of the invention.
Figure 8B:
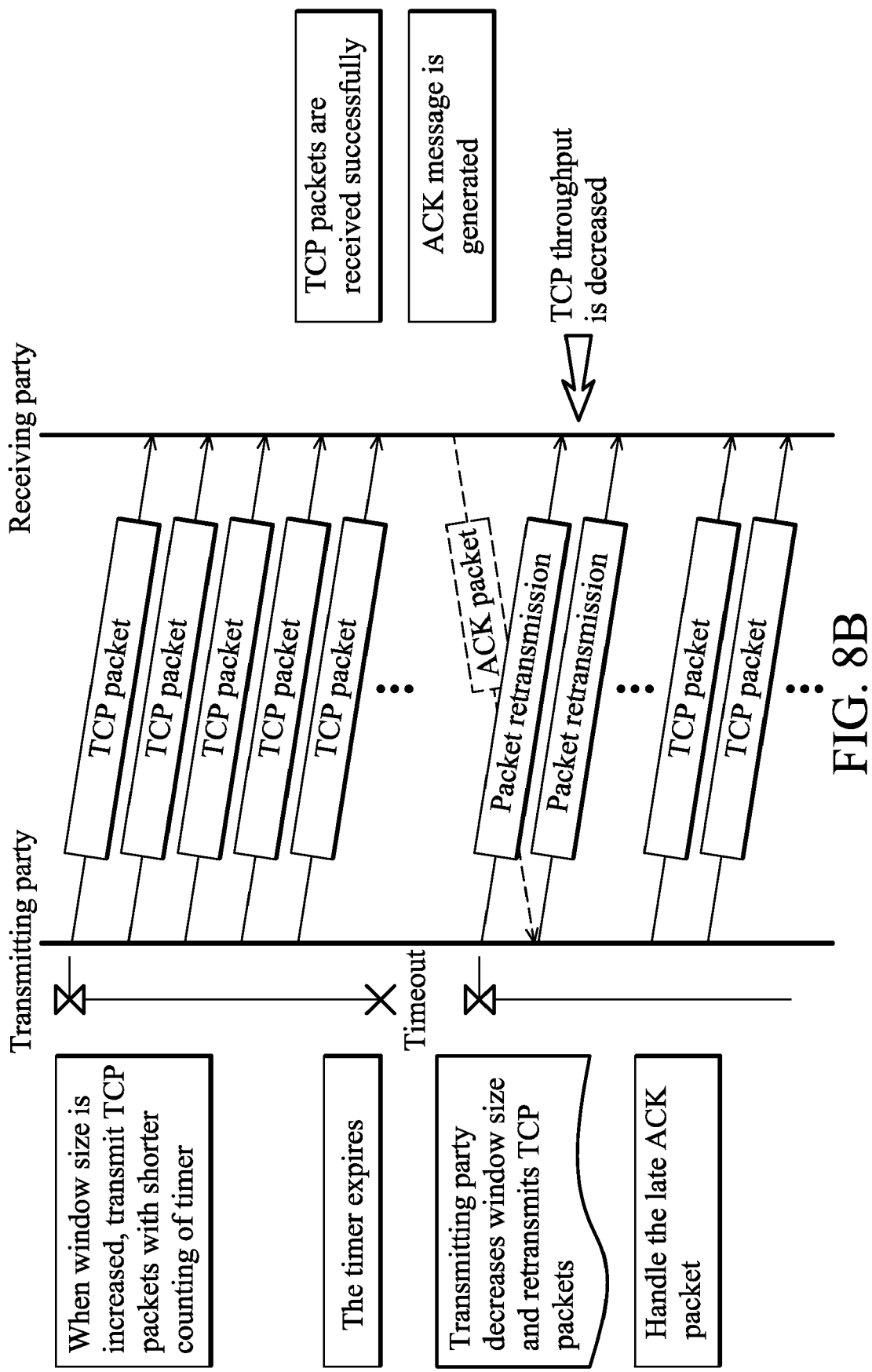
FIG. 8B shows a diagram of a decreasing sliding window according to an embodiment of the invention.

As described previously, the TCP window size determines the data throughput. The transmitting party may increase or decrease the window size based on the network condition. An example of an increasing sliding window is illustrated in FIG. 8A. In FIG. 8A, two TCP packets are initially transmitted to the receiving party. A timer for transmitted TCP packets is then started. Upon reception of the two TCP packets, the receiving party generates and issues an ACK packet to the transmitting party. If the ACK packet arrives at the transmitted party before the timer expires, the transmitted party considers that the network condition is good, and vice versa. In this embodiment, the ACK packet is received before the timer expires. Therefore, the transmitting party resets the timer, shortens the counting of the timer and increases the window size to allow more TCP packets to be transmitted in a predetermined time period. As a result, the transmitting party may be able to transmit more TCP packets (four TCP packets in this embodiment), which achieves a higher throughput. On the contrary, network congestion may occur, as shown in FIG. 8B. In FIG. 8B, five TCP packets are transmitted to the receiving party. A timer for transmitting TCP packets is then started. Upon reception of the TCP packets, the receiving party generates and issues an ACK packet to the transmitting party. In this embodiment, the ACK packet is not received before the timer expires. Therefore, the transmitting party considers that network is congested. To resolve the congestion condition, the transmitting party decreases the window size and retransmits the TCP packets with increased counting of timer. As a result, the transmitting party will transmit fewer TCP packets (two TCP packets in this embodiment), which lowers throughput.

Figure 9:
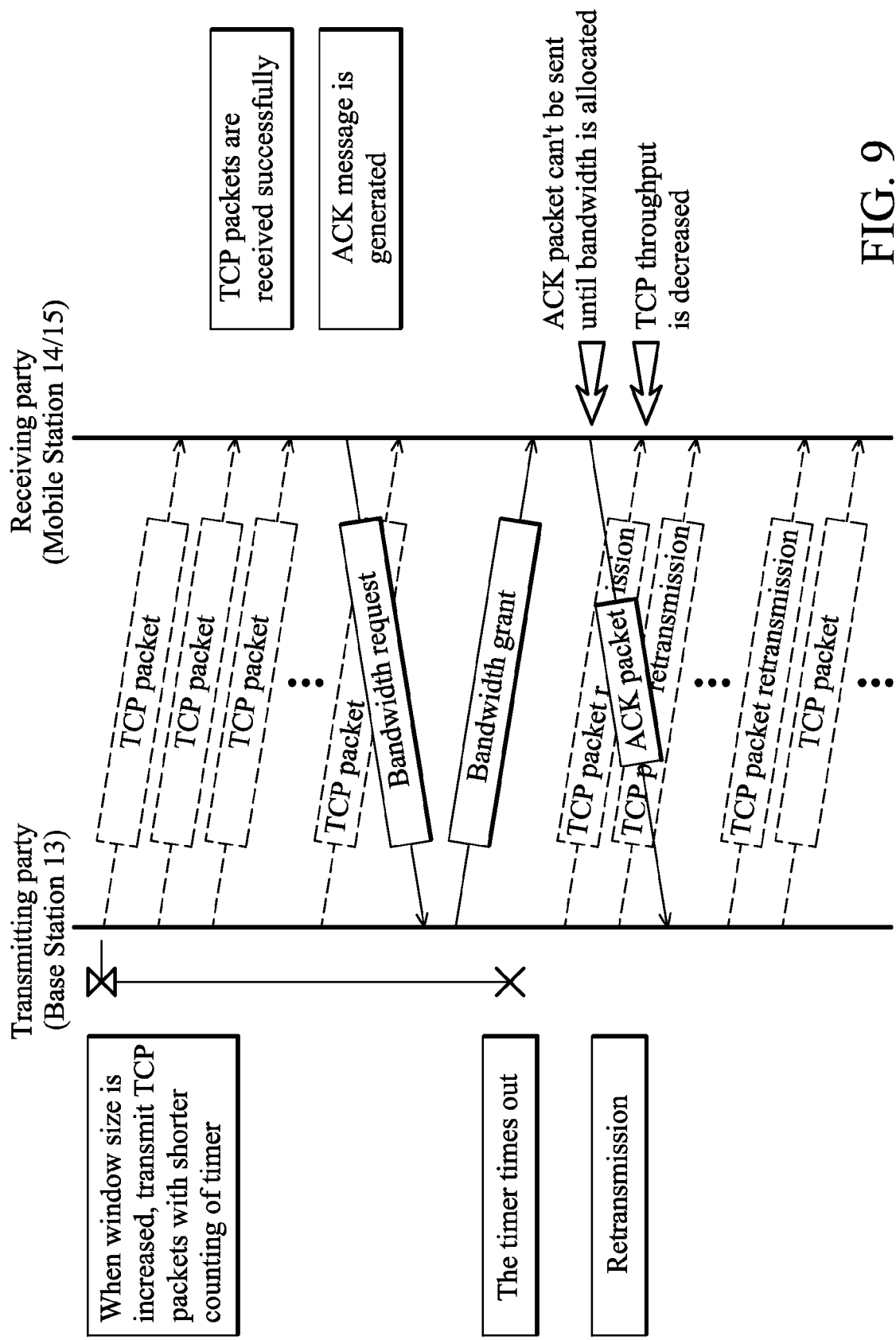
FIG. 9 shows a TCP downlink session over a WiMAX network according to an embodiment of the invention.
Figure 10:
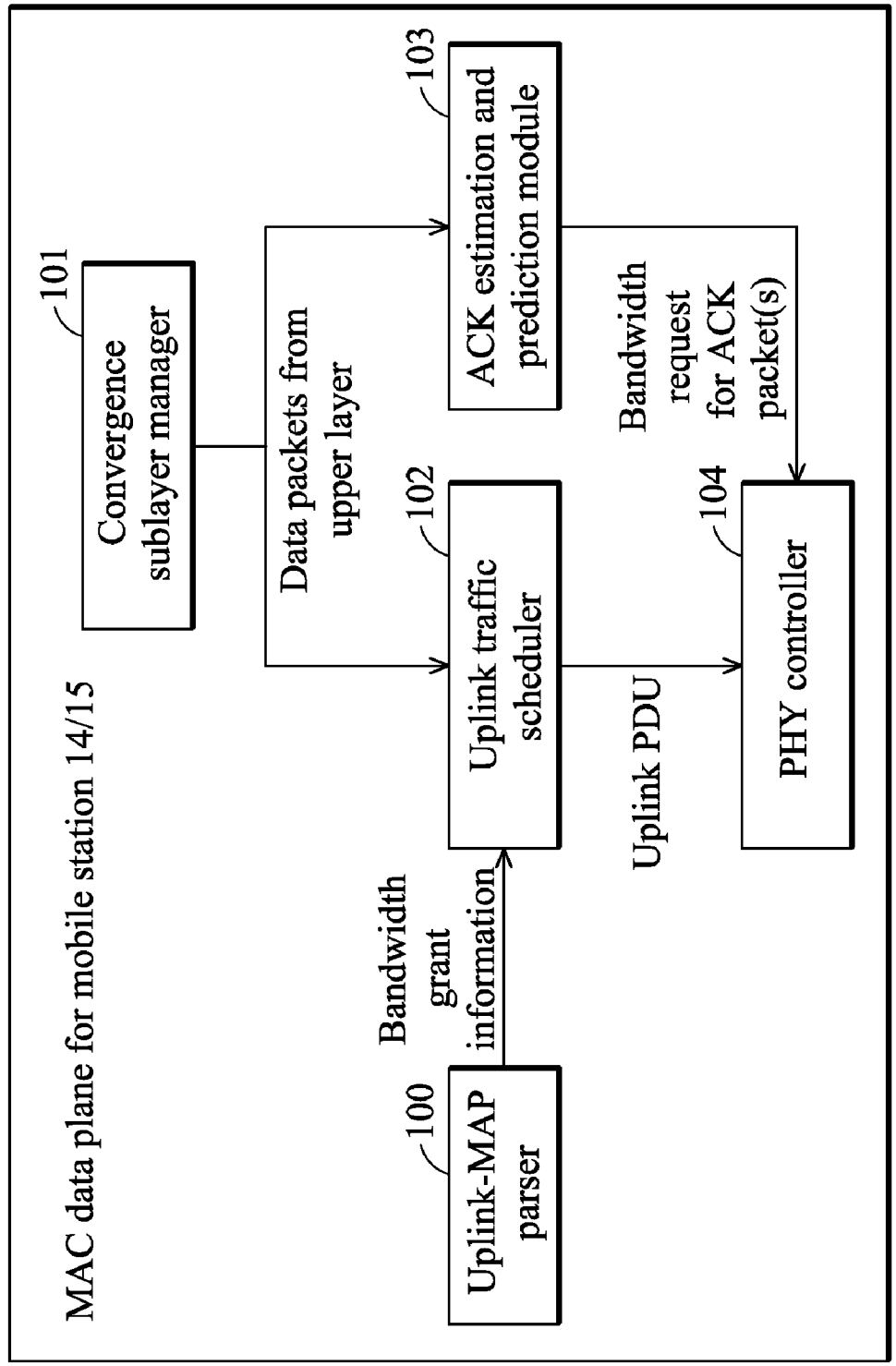
FIG. 10 shows an MAC data plane of a mobile station according to an embodiment of the invention.

Based on the above, a larger window size may be chosen for an efficient network. In addition, a packet delay or loss may affect the reply of the ACK packet, which results in a reduction of window size. For a wireless network, the transmitted TCP packets are much easier to get lost or be delayed, than when compared to a wired network. One of the reasons is that the ACK packet is damaged due to fading, shadowing, hand offs or other radio effects which do not exist in wired networks. In current TCP/IP network, any packet loss or delay is always considered as a sign of network congestion and starts to decrease the window size in a rapid scale. Thus, radio resources are underutilized. To solve this issue, WiMAX employs Automatic Repeat Request (ARQ) and Hybrid ARQ (HARQ) to enhance the error restraint ability. Additionally, another reason why wireless networks have longer transmission delay than the wired one, is that collisions or signal interferences are more frequent occurred in the air environment compared to wired networks. Because of the reasons above, for wireless networks, the access mechanism performed by the MAC always takes more time on negotiation before actual data transmission to reduce the collision. This approach also encounters transmission delay as a side effect. Take the WiMAX architecture in FIG. 1 as an example, a contention-based bandwidth ranging code or a contention-free bandwidth request is sent first before data is transmitted. Thereafter, the mobile station 14 or 15 waits for a bandwidth grant from the base station 13. The procedure of a bandwidth request takes time and causes transmission delay in the MAC layer. The delay may not damage the TCP transmission if the transmission rate is not high. If the TCP transmission rate is high and the window size is great, the transmitting party expects the receiving party to quickly reply with the ACK packets. However, transmission delay may hinder the response time of the ACK packets. As a result, the transmitting party may consider that the network condition is not good enough and maintain or even decrease the original window size. In such a case, the transmitting party may underestimate the network condition as the IP network still have more bandwidth resources available for data transmission. The following FIG. 9 illustrates a TCP downlink session over the WiMAX network 10 (for example, downloading a file from a FTP server using the mobile station 14 or 15). In FIG. 9, the base station 13 (transmitting party) initially sends a couple of TCP packets to the mobile station 14 or 15 (receiving party). Upon receipt of the TCP packets, the mobile station 14 or 15 generates an ACK packet. After the ACK packet is generated, the mobile station 14 or 15 makes a bandwidth request to the base station 13 and waits for a bandwidth grant for subsequent transmission of the ACK packet. The bandwidth request procedure delays the transmission of the ACK packet since the bandwidth request can not be issued until the ACK packet is generated. To address the drawbacks, the bandwidth request is made as early as possible to reduce the transmission delay, for example, before the ACK packet is generated. The bandwidth is preferably prepared and allocated by the base station 13 in advance so that the ACK packet may be transmitted upon completely providing the ACK packets. To achieve this, the mobile station 14 or 15 may predict the number of ACK packet(s) that is going to be generated in the near future, as well as the timings of ACK packet generation. Based on the predicted number of ACK packet(s), the mobile station 14 or 15 issues the bandwidth request to the base station 13 to acquire sufficient bandwidth for transmission of the incoming ACK packet(s) prior to the generation of ACK packet(s). Therefore, the base station 13 can receive, process and grant the bandwidth request before the ACK packet(s) arrives. Consequently, the receiving party replies with the ACK packet(s) to the transmitting party more quickly, thus, window size is increased (or FTP downlink throughput is improved). The detailed implementation is illustrated in FIG. 10.

An embodiment of an MAC data plane is introduced to provide an additional function for estimating the number and the arrival of ACK packet(s) subsequently to the base station 13 via the RF module 142. The function may be realized as an additional MAC component with or directly integrated into an uplink traffic scheduler, for example, inside of the MAC 1441. FIG. 10 shows an MAC data plane of a mobile station according to an embodiment of the invention. The MAC 1441 contains at least an uplink-MAP parser 100, a convergence sublayer manager 101, an uplink traffic scheduler 102, an ACK estimation and prediction module 103, and a PHY controller 104. The uplink traffic scheduler 102 is responsible for managing the bandwidth allocations by the base station 13. It collects the bandwidth allocations information from the uplink-MAP parser 100, as well as the uplink TCP packets from the convergence sublayer manager 101. Once the uplink traffic scheduler 102 completes transmission data arrangement, the PHY controller 104 triggers the transmission.

In addition, the ACK estimation and prediction module 103 also obtains uplink traffic information from the convergence sublayer manager 101. According to the obtained information, the ACK estimation and prediction module 103 estimates the number of ACK packet(s) that is going to be generated and predicts the timing for when the ACK packet(s) will be generated. The ACK estimation and prediction module 103 instructs the PHY controller 104 to request for the required bandwidth amount before the arrival of the ACK packet(s) to the PHY controller 104. The obtained information is treated as the input of the ACK estimation and prediction module 103 for ACK prediction and analysis. If the ACK packet(s) is expected to be generated in a near future, the ACK estimation and prediction module 103 calculates the required bandwidth for the ACK packet(s) and triggers the PHY controller 104 to perform a bandwidth request to the base station 13. The flowchart of ACK estimation and prediction is shown in FIG. 11, performed by the MAC unit 1441.

Figure 11:
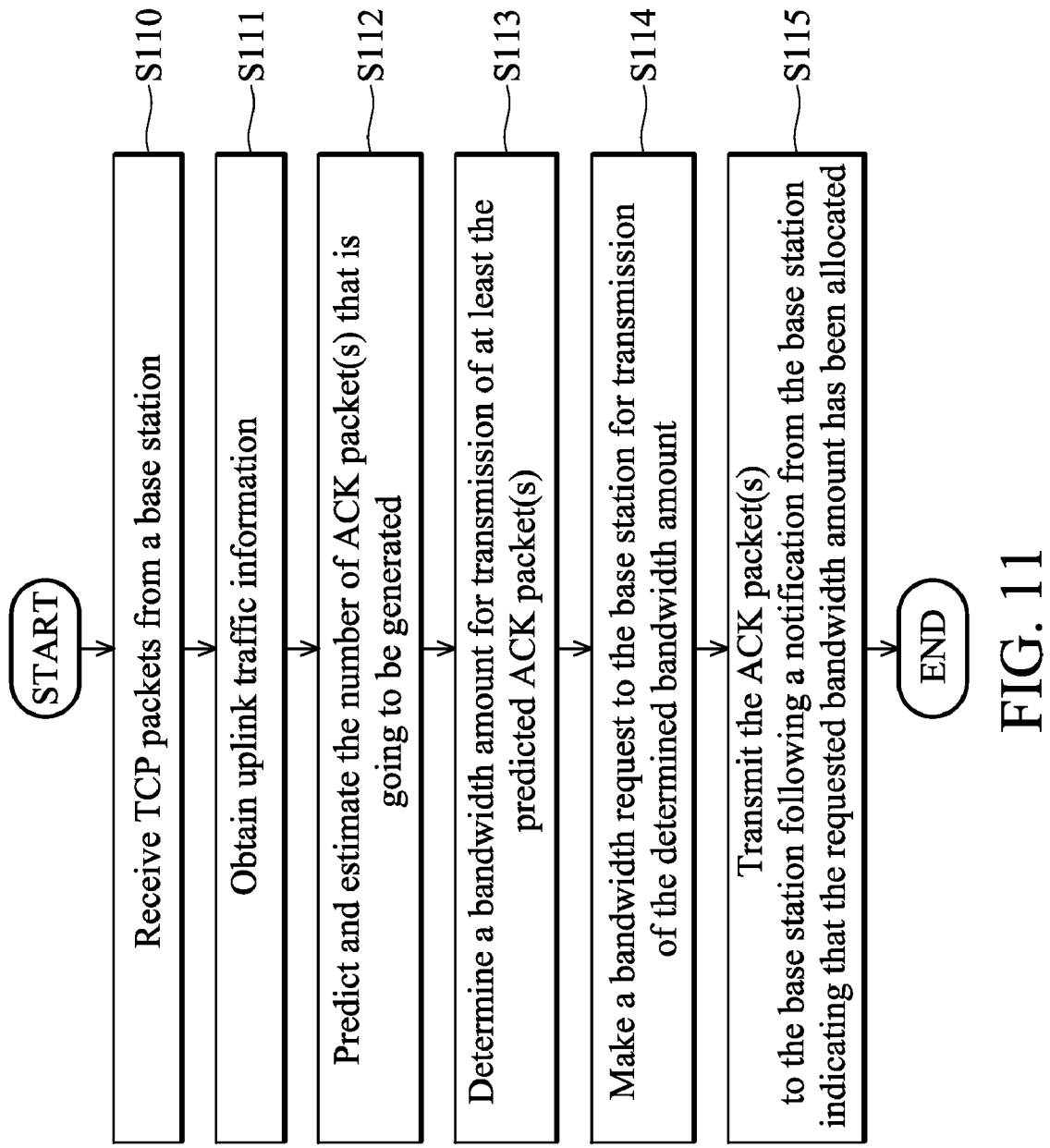
FIG. 11 shows a flowchart of ACK estimation and prediction according to an embodiment of the invention.

In FIG. 11, TCP packets are received from a base station (step S110). Next, uplink traffic information is obtained (step S111). Next, the number of ACK packet(s) that is going to be generated is predicted and estimated (step S112). Next, a bandwidth amount for transmission of at least the predicted ACK packet(s) is determined (step S113). Next, a bandwidth request for transmission of the determined bandwidth amount is made to the base station (step S114). Finally, the ACK packet(s) is/are transmitted to the base station following a notification from the base station indicating that the requested bandwidth amount has been allocated (step S115).

There are several ways to predict the ACK packet(s). The first one is to embed a TCP protocol parser (not shown) inside the ACK estimation and prediction module 113. With the TCP protocol parser, the MAC is able to analyze the historical ACK packets generated at historical time frames. Following is an exemplary formula used to calculate the number of ACK packet(s) that is going to be generated:

$$x[t] = \sum_{k=1}^{n} \omega_k \cdot x[t-k] + \Delta$$
$$= \omega_1 \cdot x[t-1] + \omega_2 \cdot x[t-2] +$$
$$\omega_3 \cdot x[t-3] + \ldots + \omega_n \cdot x[t-n] + \Delta,$$

wherein the variable t is an index of time frame, x[t] is the predicted number of ACK packet(s) at time frame t, x[t−k] is the historical number of ACK packet(s) at time frame t−k, $\omega_k$ is the weighted parameter of x[t−k], and the summation of all weighted parameters may be 1. The symbol Δ is the extra shift quantity, which may be adjusted as desired.

The above formula is a time-variant general discrete function, which predicts the forthcoming ACK packet(s) based on the historical ACK packets. In other words, the historical ACK packets generated at historical time frames with relevant weightings are used for ACK prediction. Here is a further explanation of the formula. The variable x[t−1] is the number of historical ACK packet(s) generated at a historical time frame t−1, which may be the time interval of 5 milliseconds prior to the time frame t, for example. Similarly, the variable x[t−2] is the number of historical ACK packet(s) generated at another earlier historical time frame t−2, which may be the time interval of 5 milliseconds prior to the time frame t−1, for example. By using the weighted function, it is also possible to consider the timing factor. For example, information regarding the historical ACK packet(s) generated at a recent time frame is considered more significant than that at an earlier time frame. Therefore, the historical ACK packet(s) generated at recent time frames are given a higher weighted value than earlier ones. Based on this, it is possible to predict the number of ACK packet(s) that is expected to be generated at forthcoming time frames. Although a TCP parser benefits approximation, it may require additional hardware, process time or complexity.

Another embodiment to predict and estimate the number of ACK packet(s) is based on the predicted downlink TCP packets (expressed as d[t]) that are going to be received from the base station 13, as well as the predicted uplink TCP packets (expressed as u[t]) that are going to be transmitted to the base station 13. Exemplary formulas are as follows:

$$d[t] = \sum_{k=1}^{n} \omega_k \cdot d[t-k] + \Delta_d$$
$$= \omega_1 \cdot d[t-1] + \omega_2 \cdot d[t-2] + \omega_3 \cdot d[t-3] + \ldots +$$
$$\omega_n \cdot d[t-n] + \Delta_d$$

$$u[t] = \sum_{k=1}^{n} \omega'_k \cdot u[t-k] + \Delta_u$$
$$= \omega'_1 \cdot u[t-1] + \omega'_2 \cdot u[t-2] + \omega'_3 \cdot u[t-3] + \ldots +$$
$$\omega'_n \cdot u[t-n] + \Delta_u,$$

herein, d[t] and u[t] are the downlink and uplink TCP packets observed or predicted at time frame t, d[t−k] and u[t−k] are the downlink and uplink TCP packets observed or predicted at time frame t−k, respectively, $\omega_n$ is the weighted parameter of d[t−k], k is one of 1 to n, the summation of all weighted parameters $\omega_n$ may be 1, $\omega_n'$ is the weighted parameter of u[t−k], and the summation of all weighted parameters $\omega_n'$ may be 1. The symbols $\Delta_d$ and $\Delta_u$ are the extra shift quantity, which may be adjusted as desired.

This method requires historical downlink/uplink TCP traffic statistics. All incoming (downlink) and outgoing (uplink) historical TCP packets of the mobile station 14 or 15 are taken into consideration.

Based on the predicted d[t] and u[t], the predicted number of ACK packet(s) may be determined according to the formula:

$$p[t] = \omega_u \cdot u[t] + \omega_d \cdot d[t],$$

wherein, p[t] is the predicted number of ACK packet(s) at time frame t, $\omega_u$ is the weighted parameter of u[t], and $\omega_d$ is the weighted parameter of d[t].

ACK traffic always has its own specialized pattern since the number of generated ACK packet(s) is proportional to the transmission rate and the sliding window size. The transmission rates of both the historical downlink TCP traffic and the historical uplink TCP traffic are recorded, and the expected amount of downlink and uplink TCP traffic at time frame t are derived. Based on the values, by properly adjusting the weighted values $\omega_u$ and $\omega_d$, the ACK traffic can be detected and calculated. In addition, by referring to the historical downlink TCP traffic and the historical uplink TCP traffic, the MAC is also able to determine the timing for when the subsequent ACK packet(s) will be generated.

Figure 12:
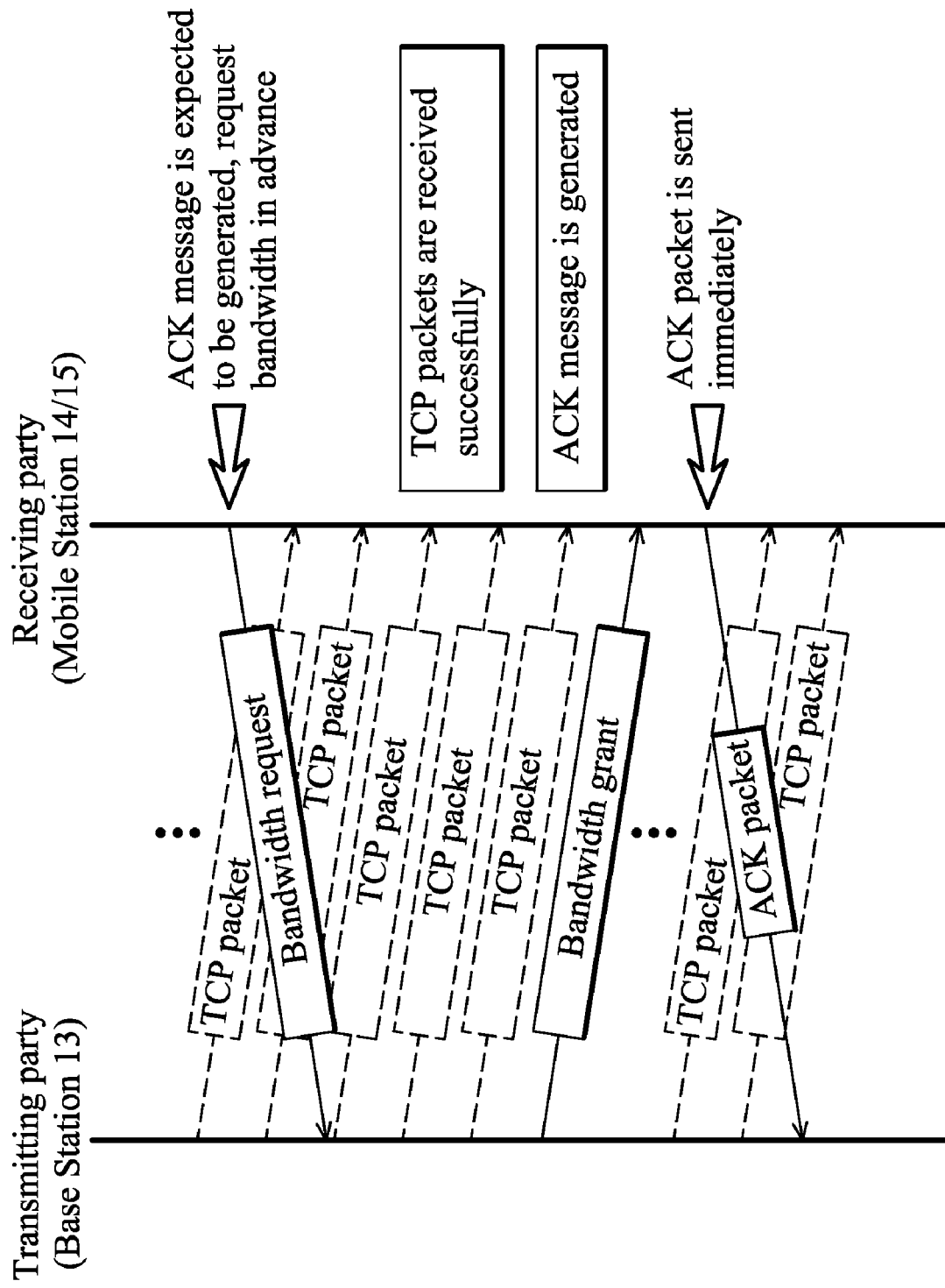
FIG. 12 shows a message sequence chart of a WiMAX network downlink session to a mobile station according to an embodiment of the invention.

FIG. 12 shows a message sequence chart of a WiMAX network downlink session to a mobile station according to an embodiment of the invention. In FIG. 12, the timing for when the ACK packet(s) will be generated is predicted, and the mobile station 14 or 15 makes a bandwidth request to the base station 13 for the predicted ACK packet(s) in advance. When the bandwidth request is granted before the ACK packet(s) is generated, the ACK packet(s) is sent immediately. The ACK message is delivered to the transmitting party more quickly via the base station 13. As a result, the transmitting party increases its sliding window size and the transmission throughput is accordingly increased.

Figure 13A:
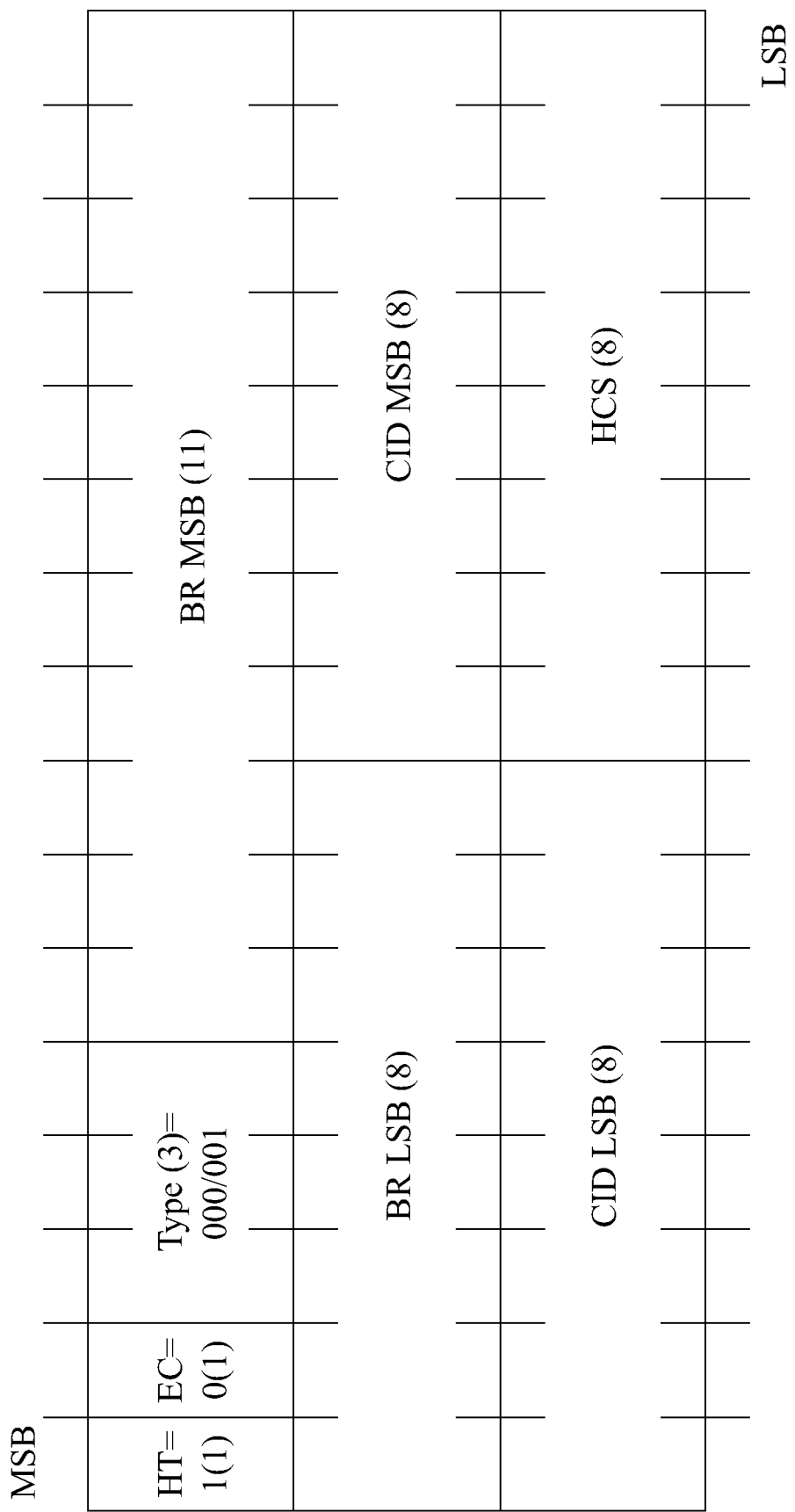
FIG. 13A shows a header of a bandwidth request according to an embodiment of the invention.
Figure 13B:
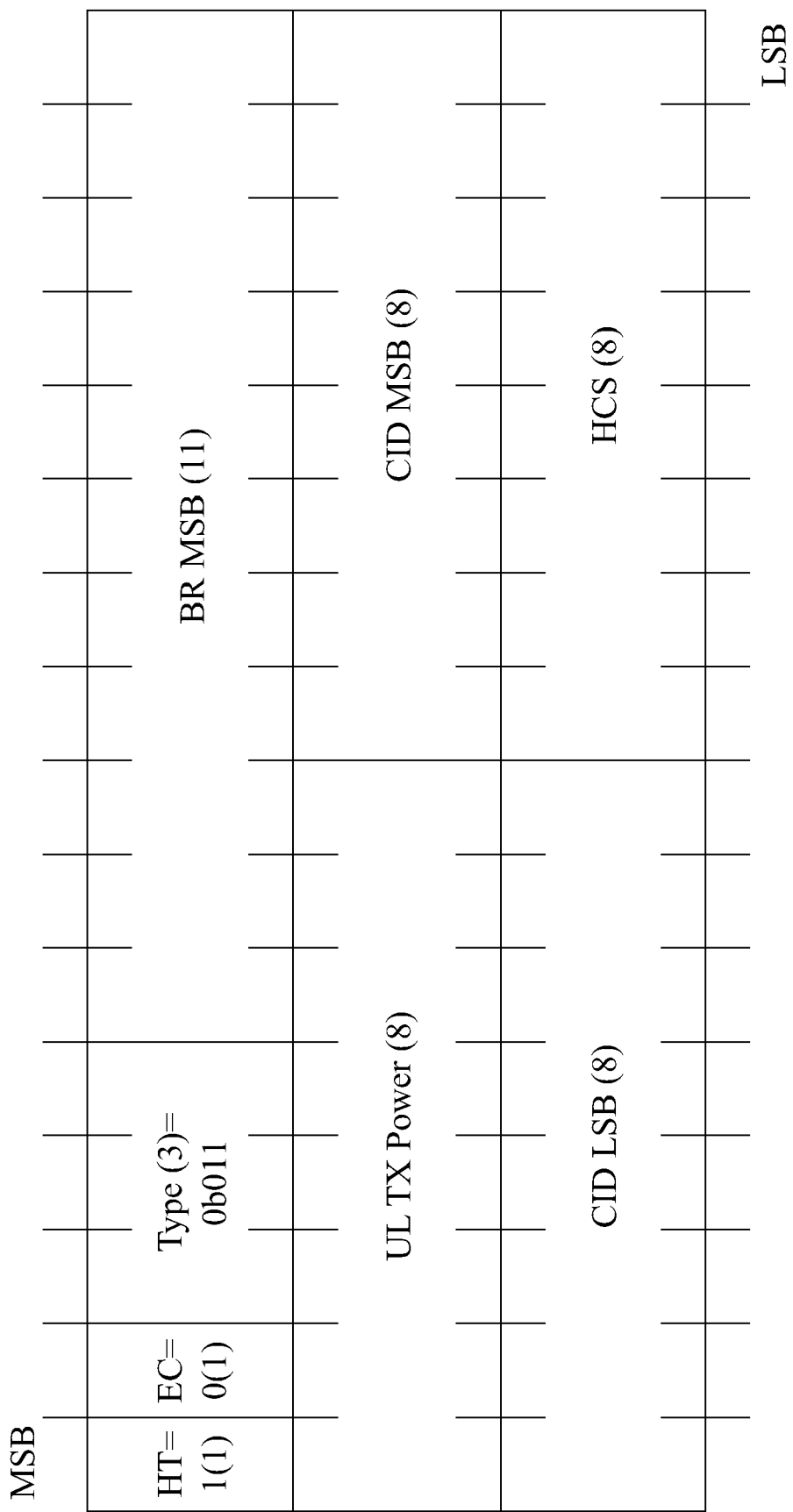
FIG. 13B shows another header of a bandwidth request according to an embodiment of the invention.
Figure 13C:
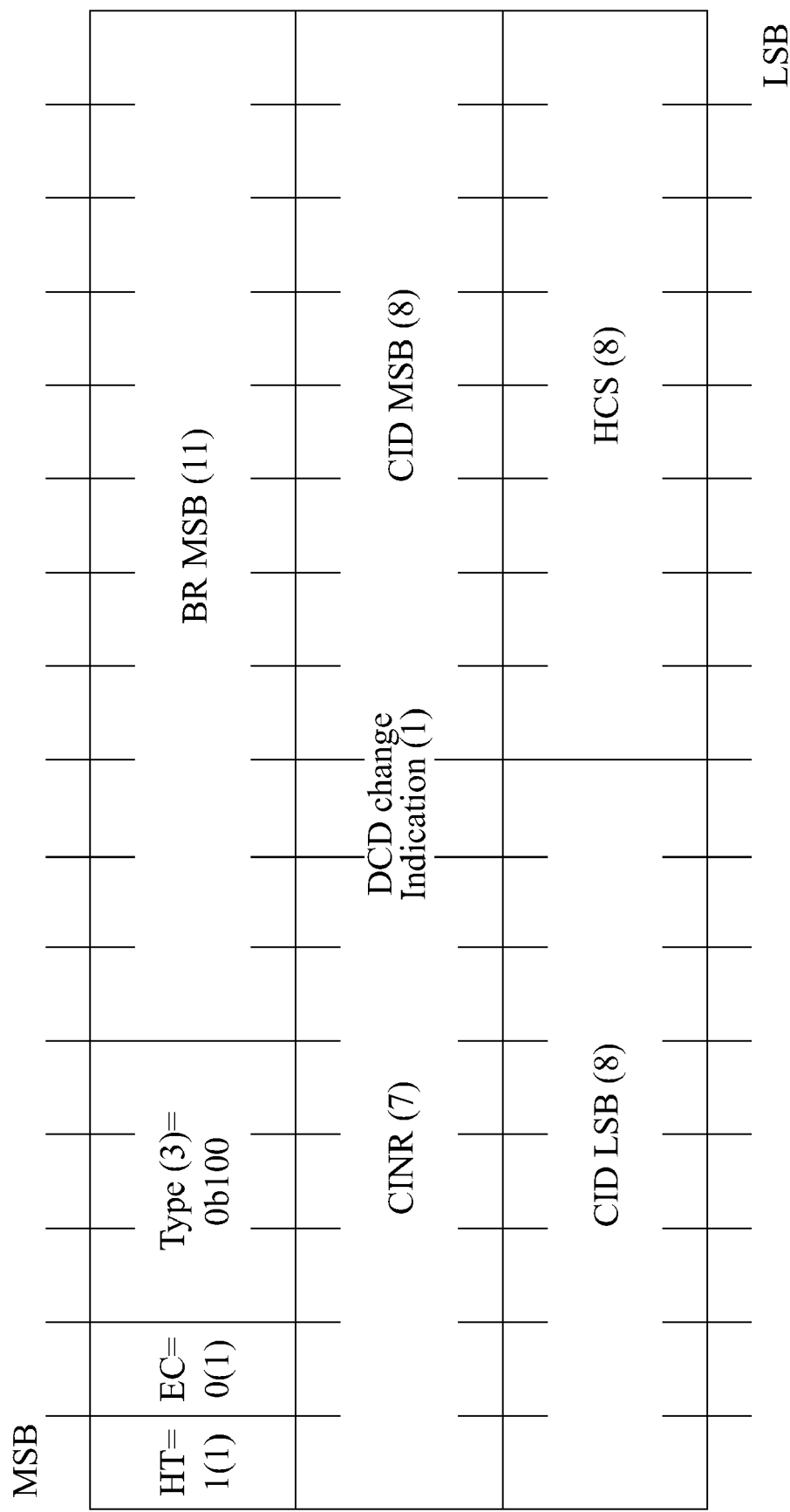
FIG. 13C shows another header of a bandwidth request according to an embodiment of the invention.
Figure 13D:
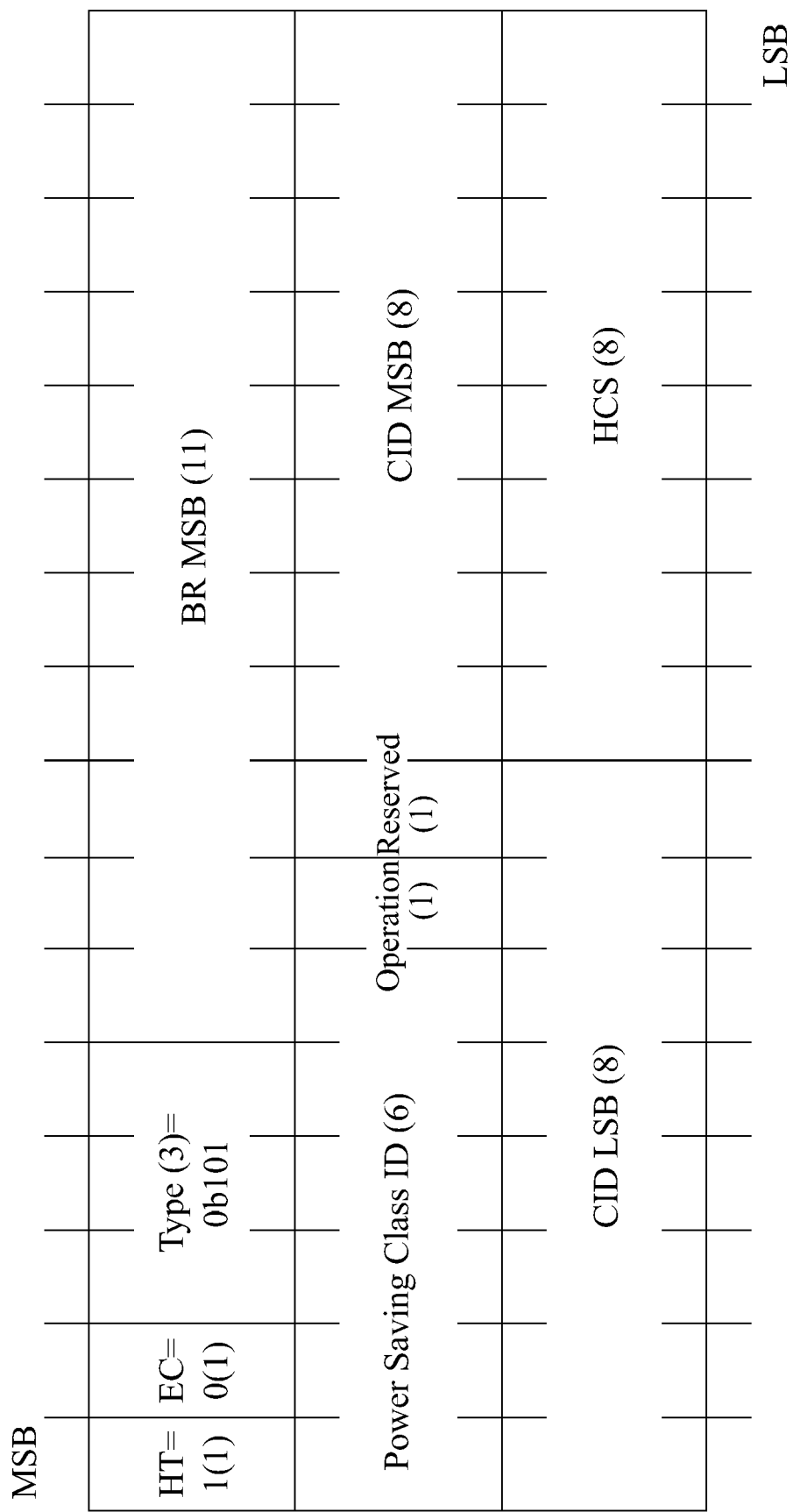
FIG. 13D shows another header of a bandwidth request according to an embodiment of the invention.

The data structure of a header of a bandwidth request is shown in FIG. 13A. The format comprises a field "BR" which indicates the required bandwidth. The required bandwidth is expressed in 19 bits. FIG. 13B shows the data structure of a header which expresses the required bandwidth and uplink transmission (Tx) power. The field "BR" indicates that the required bandwidth expressed in 11 bits. FIG. 13C shows the data structure of a header which expresses Carrier to Interference plus Noise Ratio (CINR) and the required bandwidth. The field "BR" indicates that the required bandwidth is also expressed in 11 bits. FIG. 13D shows the data structure of a header related to power saving. However, this header may also be used to request bandwidth amount. The field "BR" indicates that the required bandwidth is also expressed in 11 bits. FIG. 13E shows a Grant Management Subheader. This header is sent along with the TCP traffic. The "PiggyBack Request" field indicates the required bandwidth amount.

Apart from the WiMAX network, the invention may also be applied to other wireless networks, such as a High-Speed Uplink Packet Access (HSUPA) or Long Term Evolution (LTE) wireless network. To optimize utilization of frequency bands, recent wireless technology standards have been designed with a centralized infrastructure and request-and-grant mechanism. In addition, packet switched networks are widely used since such networks are more compatible with the Internet than circuit switched networks. The proposed embodiments of the systems and methods of the invention originated from such networks (i.e. WiMAX) and can be easily applied to other wireless networks based on similar concepts.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for boosting the downlink transmission rate to a mobile station by a media access control (MAC) unit thereof, comprising the steps of:

predicting a total number of acknowledgement (ACK) packets that are going to be generated, wherein the step of the predicting the total number of the ACK packets is determined according to a plurality of historical ACK packets generated during a plurality of historical time frames, each of the historical time frames is given a different weighted value which is multiplied by the number of the historical ACK packets therein to obtain a multiplication value, and the multiplication values of the historical time frames are summed to obtain the predicted total number of the ACK packets that are going to be generated;

predicting timing for when the ACK packets will be generated;

determining a bandwidth amount according to the predicted total number of the ACK packets, issuing a bandwidth amount request with the determined bandwidth amount from the mobile station to a base station for the ACK packets to be generated and transmitted to the base station before generation of the ACK packets;

generating the ACK packets; and instructing an RF module to transmit the ACK packets to the base station following a notification from the base station indicating that the requested bandwidth amount has been allocated.

2. A method for boosting the downlink transmission rate to a mobile station by a media access control (MAC) unit thereof, comprising the steps of:

predicting a total number of acknowledgement (ACK) packets that are going to be generated, wherein the total number of the ACK packets x[t] is predicted according to the formula:

$$x[t] = \sum_{k=1}^{n} \omega_k \cdot x[t-k] + \Delta,$$

x[t-k] is a historical number of ACK packets at time frame t-k, $\omega_k$ is the weighted parameter of x[t-k], k is 1 to n, and the symbol $\Delta$ is a shift quantity;

predicting timing for when the ACK packets will be generated;

determining a bandwidth amount according to the predicted total number of the ACK packets;

issuing a bandwidth amount request with the determined bandwidth amount from the mobile station to a base station for the ACK packets to be generated and transmitted to the base station before generation of the ACK packets;

generating the ACK packets; and instructing an RF module to transmit the ACK packets to the base station following a notification from the base station indicating that the requested bandwidth amount has been allocated.

3. A method for boosting the downlink transmission rate to a mobile station by a media access control (MAC) unit thereof, comprising the steps of:

predicting a total number of acknowledgement (ACK) packets that are going to be generated;

predicting a total number of at least one downlink TCP packet that is going to be received from a base station according to a plurality of historical downlink TCP packets received from the base station during a plurality of historical time frames;

predicting a total number of at least one uplink TCP packet that is going to be transmitted to the base station according to a plurality of historical uplink TCP packets transmitted to the base station during the historical time frames, wherein the predicted total number of the downlink TCP packet or packets is multiplied by a downlink weighted value to obtain a first value, the predicted total number of the uplink TCP packet or packets is multiplied by an uplink weighted value to obtain a second value, and the first value is added to the second value to obtain the predicted total number of the ACK packets;

predicting timing for when the ACK packets will be generated;

determining a bandwidth amount according to the predicted total number of the ACK packets;

issuing a bandwidth amount request with the determined bandwidth amount from the mobile station to the base station for the ACK packets to be generated and transmitted to the base station before generation of the ACK packets;

generating the ACK packets; and instructing an RF module to transmit the ACK packets to the base station following a notification from the base station indicating that the requested bandwidth amount has been allocated.

4. The method as claimed in claim 3, wherein each of the historical time frames is given a different weighted value which is multiplied by the total number of the historical downlink/uplink TCP packets therein to obtain a multiplication value, and the multiplication values for the historical time frames are summed to obtain the predicted total number of the downlink/uplink TCP packet or packets that is going to be received from/transmitted to the base station.

5. The method as claimed in claim 3, wherein the total number of the at least one downlink TCP packet d[t] is predicted according to the formula:

$$d[t] = \sum_{k=1}^{n} \omega_k \cdot d[t-k] + \Delta_d,$$

d[t-k] is the total number of historical downlink ACK packet(s) at time frame t-k, $\omega_k$ is the weighted parameter of d[t-k], the symbol $\Delta_d$ is a shift quantity of d[t], and the total number of the at least one uplink TCP packet u[t] is predicted according to the formula:

$$u[t] = \sum_{k=1}^{n} \omega'_k \cdot u[t-k] + \Delta_u,$$

u[t-k] is the total number of historical uplink ACK packet(s) at time frame t-k, $\omega'_k$ is the weighted parameter of u[t-k], k is 1 to n, and the symbol $\Delta_u$ is a shift quantity of u[t].

6. A method for boosting the downlink transmission rate to a mobile station by a media access control (MAC) unit thereof, comprising the steps of:

predicting a total number of at least one downlink TCP packet d[t] that is going to be received from a base station according to a plurality of historical downlink TCP packets received from the base station during a plurality of historical time frames;

predicting a total number of at least one uplink TCP packet u[t] that is going to be transmitted to the base station according to a plurality of historical uplink TCP packets transmitted to the base station during the historical time frames;

predicting a total number of acknowledgement (ACK) packets that are going to be generated, wherein the step of predicting the total number of the ACK packets is determined according to the formula: $p[t]=\omega_u \cdot u[t]+\omega_d \cdot d[t]$, p[t] is the predicted total number of the ACK packets, $\omega_d$ is a downlink weighted value of d[t], $\omega_u$ is an uplink weighted value of u[t];

predicting timing for when the ACK packets will be generated;

determining a bandwidth amount according to the predicted total number of the ACK packets;

issuing a bandwidth amount request with the determined bandwidth amount from the mobile station to the base station for the ACK packets to be generated and transmitted to the base station before generation of the ACK packets;

generating the ACK packets; and instructing an RF module to transmit the ACK packets to the base station following a notification from the base station indicating that the requested bandwidth amount has been allocated.

7. A system for boosting the downlink transmission, comprising:

a media access control (MAC) unit coupled to a radio frequency (RF) module, predicting a total number of acknowledgement (ACK) packets that are going to be generated, predicting timing for when the ACK packets will be generated, wherein the total number of the ACK packets is predicted according to a plurality of historical ACK packets generated during a plurality of historical time frames, each of the historical time frames is given a different weighted value which is multiplied by the total number of the historical ACK packets therein to obtain a multiplication value, and the multiplication values for the historical time frames are summed to obtain the predicted total number of the ACK packets that are going to be generated, determining a bandwidth amount according to the predicted total number of the ACK packets, issuing a bandwidth amount request with the determined bandwidth amount from a mobile station to a base station for the ACK packets to be generated and transmitted to the base station before generation of the ACK packets, generating the ACK packets, and directing the RF module to transmit the generated packets to the base station following a notification from the base station indicating that the requested bandwidth amount has been allocated.

8. The system as claimed in claim 7, wherein the MAC unit further comprises:
an PHY controller transmitting data to a base station once the data is arrived;
an acknowledgement (ACK) estimation and prediction module predicting the total number of ACK packets that are going to be generated, predicting timing for when the ACK packets will be generated, predicting the bandwidth amount for transmission of the ACK packets and sending a bandwidth request to the PHY controller for requesting the base station for the predicted bandwidth amount; and
an uplink traffic scheduler providing and sending at least one ACK packet to the PHY controller following the notification from the base station indicating that the requested bandwidth amount has been allocated.

9. A system for boosting the downlink transmission, comprising:
a media access control (MAC) unit coupled to a radio frequency (RF) module, predicting a total number of acknowledgement (ACK) packets that are going to be generated, wherein the total number of the ACK packets x[t] is predicted according to the formula:

$$x[t] = \sum_{k=1}^{n} \omega_k \cdot x[t-k] + \Delta,$$

x[t-k] is a historical number of ACK packets at time frame t-k, $\omega_k$ is the weighted parameter of x[t-k], k is 1 to n, and the symbol $\Delta$ is a shift quantity, predicting timing for when the ACK packets will be generated, determining a bandwidth amount according to the predicted total number of the ACK packets, issuing a bandwidth amount request with the determined bandwidth amount from a mobile station to a base station for the ACK packets to be generated and transmitted to the base station before generation of the ACK packets, generating the ACK packets, and directing the RF module to transmit the generated packets to the base station following a notification from the base station indicating that the requested bandwidth amount has been allocated.

10. A system for boosting the downlink transmission, comprising:
a media access control (MAC) unit coupled to a radio frequency (RF) module, predicting a total number of acknowledgement (ACK) packets that are going to be generated, predicting a total number of at least one downlink TCP packet that is going to be received from a base station according to a plurality of historical downlink TCP packets received from the base station during a plurality of historical time frames, and predicting a total number of at least one uplink TCP packet that is going to be transmitted to the base station according to a plurality of historical uplink TCP packets transmitted to the base station during the historical time frames, wherein the predicted total number of the downlink TCP packet or packets is multiplied by a downlink weighted value to obtain a first value, the predicted total number of the uplink TCP packet or packets is multiplied by an uplink weighted value to obtain a second value, and the first value is added to the second value to obtain the predicted total number of the ACK packets, predicting timing for when the ACK packets will be generated, determining a bandwidth amount according to the predicted total number of the ACK packets, issuing a bandwidth amount request with the determined bandwidth amount from a mobile station to the base station for the ACK packets to be generated and transmitted to the base station before generation of the ACK packets, generating the ACK packets, and directing the RF module to transmit the generated packets to the base station following a notification from the base station indicating that the requested bandwidth amount has been allocated.

11. The system as claimed in claim 10, wherein each of the historical time frames is given a different weighted value which is multiplied by the total number of the historical downlink/uplink TCP packets therein to obtain a multiplication value, and the multiplication values for the historical time frames are summed to obtain the predicted total number of the downlink/uplink TCP packet or packets that is going to be received from/transmitted to the base station.

12. A system for boosting the downlink transmission, comprising:
a media access control (MAC) unit coupled to a radio frequency (RF) module, predicting a total number of acknowledgement (ACK) packets that are going to be generated, predicting a total number of at least one downlink TCP packet d[t] that is going to be received from a base station according to a plurality of historical downlink TCP packets received from the base station during a plurality of historical time frames, and predicting a total number of at least one uplink TCP packet u[t] that is going to be transmitted to the base station according to a plurality of historical uplink TCP packets transmitted to the base station during the historical time frames, wherein the predicted total number of the ACK packets p[t] is determined according to the formula: p[t]=$\omega_u$·u[t]+$\omega_d$·d[t], $\omega_d$ is a downlink weighted value of d[t], $\omega_u$ is an uplink weighted value of u[t], predicting timing for when the ACK packets will be generated, determining a bandwidth amount according to the predicted total number of the ACK packets, issuing a bandwidth amount request with the determined bandwidth amount from a mobile station to the base station for the ACK packets to be generated and transmitted to the base station before generation of the ACK packets, generating the ACK packets, and directing the RF module to transmit the generated packets to the base station following a notification from the base station indicating that the requested bandwidth amount has been allocated.

13. The system as claimed in claim 12, wherein the total number of the at least one downlink TCP packet d[t] is predicted according to the formula:

$$d[t] = \sum_{k=1}^{n} \omega_k \cdot d[t-k] + \Delta_d,$$

d[t-k] is the total number of historical downlink ACK packet(s) at time frame t-k, $\omega_k$ is the weighted parameter of d[t-k], the symbol $\Delta^d$ is a shift quantity of d[t], and the total number of the at least one uplink TCP packet u[t] is predicted according to the formula:

$$u[t] = \sum_{k=1}^{n} \omega'_k \cdot u[t-k] + \Delta_u,$$

u[t-k] is the total number of historical uplink ACK packet(s) at time frame t-k, $\omega'_k$ is the weighted parameter of u[t-k], k is 1 to n, the symbol $\Delta_u$ is a shift quantity of u[t].

* * * * *